United States Patent [19]

Saito et al.

[11] Patent Number: 5,496,653
[45] Date of Patent: Mar. 5, 1996

[54] MAGNETIC RECORDING MEDIUM WITH LONGITUDINAL GLOSSINESS 200% OR MORE

[75] Inventors: Shinji Saito; Nobuo Yamazaki; Hitoshi Noguchi, all of Kanagawa, Japan

[73] Assignee: Fuji Photo Film Co., Ltd., Kanagawa, Japan

[21] Appl. No.: 245,486

[22] Filed: May 18, 1994

[30] Foreign Application Priority Data

May 18, 1993 [JP] Japan ................. 5-116140

[51] Int. Cl.$^6$ ................. G11B 5/66; G11B 5/70
[52] U.S. Cl. ................. 428/694 B; 428/694 BS; 428/694 BR; 428/694 BA; 428/694 BH; 428/694 BM; 428/900
[58] Field of Search ................. 428/694 B, 694 BS, 428/694 BR, 694 BH, 694 BM, 694 BA, 900

[56] References Cited

U.S. PATENT DOCUMENTS

| | | | |
|---|---|---|---|
| 4,666,770 | 5/1987 | Asai et al. ................. | 428/323 |
| 5,063,105 | 11/1991 | Ryoke et al. ................. | 428/336 |
| 5,114,778 | 5/1992 | Yanai et al. ................. | 428/141 |

FOREIGN PATENT DOCUMENTS 62204427  2/1990  Japan .

*Primary Examiner*—Paul J. Thibodeau
*Assistant Examiner*—Stephen Sand
*Attorney, Agent, or Firm*—Sughrue, Mion, Zinn, Macpeak & Seas

[57] ABSTRACT

A magnetic recording medium having good characteristics over all recording wavelength regions, comprising a non-magnetic support having thereon a magnetic layer mainly comprising a tabular ferromagnetic hexagonal ferrite particle and a binder, wherein said ferromagnetic hexagonal ferrite powder is magnetically orientated in the longitudinal direction of the medium, and said magnetic layer has a glossiness in the longitudinal direction of the medium of 200% or more and at least 3% higher than that in the width direction of the medium.

4 Claims, No Drawings

MAGNETIC RECORDING MEDIUM WITH LONGITUDINAL GLOSSINESS 200% OR MORE

FIELD OF THE INVENTION

The present invention relates to a high-density recording magnetic medium having a magnetic layer containing a tabular ferromagnetic hexagonal ferrite particle as the most upper layer.

BACKGROUND OF THE INVENTION

Previously, magnetic recording media such as video tapes, audio tapes and magnetic disks have been widely used which comprise non-magnetic supports having thereon magnetic layers, said magnetic layers containing ferromagnetic iron oxide, Co-modified ferromagnetic iron oxide, $CrO_2$, ferromagnetic alloy particles, ferromagnetic hexagonal ferrite or the like. In particular, ferromagnetic hexagonal ferrite is considered to be excellent in high-density recording characteristics because of its small particle size, its tabular shape and its axis of easy magnetization perpendicular to the plate surface. However, the difficulty of dispersion due to its high coagulation results in inferior surface properties, and also in orientation inferior to that of other magnetic particles. Ferromagnetic hexagonal ferrite have not therefore been able to provide sufficient electromagnetic characteristics, although it has the potential for a ferromagnetic particle for high-density recording media. Hexagonal ferrite further has the problem that long-wavelength characteristics is inferior because of its low saturation magnetization ($\sigma s$).

In order to solve these problems, JP-A-62-204427 (the term "JP-A" as used herein means an "unexamined published Japanese patent application") and JP-A-60-223018 disclose magnetic recording media each comprising a magnetic layer containing a ferromagnetic hexagonal ferrite particle and another magnetic layer combined therewith, whereby high output can be obtained over a wide range of recording wavelength. JP-A-4-119520, JP-A-63-71926 and JP-A-61-220125 disclose magnetic recording media each having a multiple-layer structure with another non-magnetic layer. However, these attempts are not satisfactory as high-density recording media now required.

JP-A-63-281221 and JP-A-4-19815 disclose the control of surface roughness (Ra). This decreases noise effectively, but is insufficient particularly for improving characteristics in a short-wavelength recording region. JP-A- 61-24010 and U.S. Pat. No. 4,666,770 disclose glossiness. However, this is insufficient as high-density recording media now required.

As one concept considered from a ferromagnetic particle, means for improving the recording density include minimization of a magnetization unit on a magnetic layer and arrangement thereof in a running direction of a magnetic head, enlargement of magnetization, and arrangement of magnetic orientation corresponding to the running direction of the magnetic head. For the magnetization unit, it is effective to reduce the size of particles, or to arrange the magnetic particles densely on a surface of the magnetic layer. With respect to the magnetization, the magnetic characteristics of the magnetic particles themselves and the filling degree thereof in the magnetic layer are important. For the magnetic orientation, arrangement of the ferromagnetic particles with the axis of easy magnetization arranged is considered to be important. In any event, the recording density is significantly influenced by the shape of the magnetic particles and the arrangement thereof in the magnetic layer.

As described above, the prior art for obtaining high-density recording magnetic media includes a reduction in particle size of the ferromagnetic particles, an increase in saturation magnetization ($\sigma s$) of the ferromagnetic particles, and an increase in orientation of the ferromagnetic particles in the magnetic layer. These various proposals are insufficient yet for realizing high-density recording, for example, in a recording wavelength of 0.5 µm or less.

SUMMARY OF THE INVENTION

An object of the present invention is to provide a magnetic recording medium suitable for high-density recording, and particularly a magnetic recording medium having good characteristics over all recording wavelength regions, namely having high output in a short-wavelength region of a recording wavelength of 0.5 µm or less and also in a long-wavelength region.

In order to increase the recording density, the present inventors studied the minimization of the magnetization unit, the filling degree of ferromagnetic particles and the magnetic orientation thereof, and further studied the glossiness in detail as an indication of the smoothness of magnetic layers, instead of the center line average surface roughness. This study revealed that the magnetic layers of magnetic recording media, for example, described in JP-A-61-24010 did not necessarily provide sufficient characteristics at levels now required, in spite of their high glossiness. The present inventors further examined the cause of this result, and discovered the fact that the direction of the surface glossiness was closely related to the high-density characteristics of the magnetic recording media and regulation of this was important to attain the excellent characteristics.

Further, making use of the features that the shape of the particles is tabular, and that the axis of easy magnetization thereof is perpendicular to the plate surface, the present inventors have discovered that the above-described object can be effectively attained by adjusting the direction of the glossiness of the magnetic layers containing the tabular ferromagnetic hexagonal ferrite particles as the ferromagnetic particles, thus completing the present invention.

The above-described object of the present invention can be achieved by a magnetic recording medium comprising a non-magnetic support having thereon a magnetic layer mainly comprising a tabular ferromagnetic hexagonal ferrite particle and a binder, wherein said ferromagnetic hexagonal ferrite particle is magnetically oriented in the longitudinal direction of the medium, and said magnetic layer has a glossiness in the longitudinal direction of the medium of 200% or more and at least 3% higher than that in the width direction of the medium.

DETAILED DESCRIPTION OF THE INVENTION

In the magnetic layer of the magnetic recording medium of the present invention, the tabular ferromagnetic hexagonal ferrite particle is magnetically oriented in the longitudinal direction of the medium, namely in the running direction of the medium in recording and reproduction, and the axis of easy magnetization is perpendicular to the plate surface. The particles are therefore arranged, directing the plate surfaces longitudinally and opposing them to one another. Moreover, the longitudinal glossiness is so considerably high as 200% or more, and the tabular ferromagnetic hexagonal ferrite particles are well dispersed and densely arranged. For this reason, a spacing loss caused by a space between a magnetic head and the magnetic layer can be reduced, and particularly, the output in a recording wavelength region of short wavelength can be considered to be increased. In this invention, the glossiness (i.e., the longitudinal glossiness) in the longitudinal direction of the magnetic layer is not only 200% or more, but also raised at least 3% higher than the glossiness in the width direction thereby excellently improving the electromagnetic characteristics of the magnetic recording medium of the present invention.

Although the cause of this phenomenon is not clear, it is presumed as follows.

Short-wavelength recording required for the high-density recording is largely influenced by the spacing loss, and significantly affected by the surface roughness. Previously, the center line average surface roughness has been used as an indication. This indicates the roughness in the range of relatively long wavelengths. It has been revealed that the short-wavelength recording characteristics are not improved so much even if this roughness is decreased. On the other hand, the glossiness shows the reflectance of visible light, so that it indicates the roughness in relatively short wavelengths. In order to improve the short-wavelength characteristics, therefore, an improvement in glossiness is considered to be important. However, only such a technique can not provide the sufficient characteristics. The characteristics can be significantly improved by raising the longitudinal glossiness (i.e., the glossiness in the longitudinal direction) at least 3% higher than the glossiness in the width direction as in the present invention. This is considered to be closely related to the shape of the magnetic particles and the arrangement thereof. Namely, the increased number of the magnetic particles per unit length in a certain direction conceivably raises the light reflectance in its direction, and conversely, the decreased number of the particles possibly lowers the light reflectance in its direction. In the short-wavelength recording, particularly when the recording wavelength is shortened to 0.5 μm or less, it approaches the size of the magnetic particles. The output is therefore influenced by the size of one unit of magnetization. The increased number of the magnetic particles is considered to reduce the size of a magnetization unit in a recording direction, thereby improving the output. The ferromagnetic hexagonal ferrite particles are generally tabular in shape, and the thickness thereof is thinner than the diameter thereof. However, the longitudinal glossiness of the conventional media is the same as or lower than the glossiness in the width direction. The reason for this is considered to be that the magnetic particles are difficult to longitudinally approach one another because of rotation of the plate surfaces of the magnetic particles in the surface of the magnetic layer during longitudinal orientation, which results in the number of the magnetic particles in the longitudinal direction which is the same as or lower than that in the width direction. For the conventional media containing hexagonal ferrite, many patent applications giving attention to the residual magnetic flux density, the coercive force and the squareness ratio have been filed. However, all of these are the whole average characteristics of the magnetic layer. In order to obtain characteristics which can cope with the today's high-density recording, the object can not be attained only by giving attention to such average characteristics in the recording direction. In the present invention, it has become clear in the course of completion of the present invention that the characteristics largely vary depending on whether the spaces exist mainly in the longitudinal direction (many spaces exist among the magnetic particles in the longitudinal direction) or in the width direction (many spaces exist among the magnetic particles in the width direction) by the effect of orientation of the magnetic particles even if the magnetic layers have the same filling degree of the magnetic particles.

The magnetic recording medium of the present invention may have one magnetic layer described above which contains the tabular ferromagnetic hexagonal ferrite particle. However, a magnetic layer containing an acicular ferromagnetic particle may be preferably provided immediately under the magnetic layer containing the tabular ferromagnetic hexagonal ferrite particle to improve further the long-wavelength characteristics.

Further, a non-magnetic layer mainly containing a non-magnetic particle and a binder may be preferably provided between the non-magnetic support and the magnetic layer to improve further the surface properties since the magnetic layer containing the tabular ferromagnetic hexagonal ferrite particle is easily thinned. It is particularly preferred that both the magnetic layer containing the acicular ferromagnetic particle and the non-magnetic layer mainly containing a non-magnetic particle and a binder are provided between the magnetic layer containing the tabular ferromagnetic hexagonal ferrite particle and the non-magnetic support.

In the magnetic recording medium of the present invention, even if any of the above-described layer constitutions is employed, the object of the present invention can be attained by locating the magnetic layer containing the tabular ferromagnetic hexagonal ferrite particle as the most upper layer.

The longitudinal glossiness of the magnetic layer of the magnetic recording medium of the present invention is 200% or more, preferably 220% or more, and more preferably 250% or more. A longitudinal glossiness of less than 200% causes the increased surface roughness in the short-wavelength region and lowers the short-wavelength output, regardless of the glossiness in the width direction, so that the object of the present invention can not be attained. The longitudinal glossiness is at least 3% higher than the glossiness in the width direction, and preferably at least 5% higher, and more preferably at least 10% higher, than the glossiness in the width direction. If the longitudinal glossiness is not at least 3% higher than the glossiness in the width direction, the short-wavelength output is unfavorably lowered.

For the longitudinal orientation of the magnetic layer containing the tabular ferromagnetic hexagonal ferrite particle of the present invention, the squareness ratio in the longitudinal direction is generally 0.6 or more, and more preferably 0.8 or more. If the squareness ratio is less than 0.6, the output in the whole region is undesirably lowered.

On the other hand, the magnetic layer of the magnetic recording medium of the present invention has a SFD (switching field distribution) in the longitudinal direction (i.e., the longitudinal SFD) of generally 0.5 or less, preferably 0.3 or less, and more preferably 0.1 or less. A longitudinal SFD of more than 0.5 undesirably causes the short-wavelength output to be lowered.

The magnetic layer containing the tabular ferromagnetic hexagonal ferrite particle has a coercive force in the longitudinal direction of the magnetic layer of generally 500 to 4,000 oersteds (Oe) and more preferably 1,000 to 2,000 Oe. A coercive force of less than 500 Oe unfavorably lowers the short-wavelength output, and a coercive force of more than 4,000 Oe undesirably makes recording in a head magnetic field difficult. The longitudinal residual magnetic flux density is desirably 1,000 G or more. If it is less than 1,000 G, the output in the whole region is lowered. It has no particular upper limitation, but it is usually 2,500 G or less. It is preferable that the magnetic layer containing the tabular ferromagnetic hexagonal ferrite particle has a thickness of 2 μm or less. The thickness can be changed according to the purpose. For example, when the magnetic layer is only one layer containing the tabular ferromagnetic hexagonal ferrite particle, it is preferred that the magnetic layer has a thickness of 0.5 to 2 μm (particularly 0.5 to 1.0 μm). Further, when provided with another magnetic layer as a lower layer, the magnetic layer containing the tabular ferromagnetic hexagonal ferrite particle preferably has a thickness of 0.01 to 1 μm (particularly 0.02 to 0.5 μm).

When the thickness of the magnetic layer is without the above-described range, for example, in the case of the magnetic recording medium having only one magnetic layer containing the tabular ferromagnetic hexagonal ferrite particle, a magnetic layer thickness of less than 0.5 μm results, in a reduction in the output in the long-wavelength region, and a thickness of more than 2 μm causes the surface roughness of the magnetic layer to be roughened to lower the output in the short-wavelength region. When another magnetic layer is formed as the lower layer, the upper magnetic layer having a thickness of less than 0.01 μm undesirably provides remarkable coating defects of the surface of the magnetic layer, and exceeding 1 μm unfavorably results in a reduction in the output in the long-wavelength region.

The tabular ferromagnetic hexagonal ferrite particles used in the present invention desirably have a tabular ratio (particle diameter/plate thickness) of generally 2 to 15, and desirably 3 to 7.

The particle diameter (tabular diameter) is preferably 0.01 to 0.2 μm, and more preferably 0.03 to 0.1 μm. The average thickness (tabular thickness) is usually 0.001 to 0.2 μm, and preferably 0.003 to 0.05 μm. The specific surface area (S BET) of the hexagonal ferrite fine particles measured by the BET method is preferably 25 to 100 $m^2/g$, and more preferably 4 to 70 $m^2/g$. A specific surface area of less than 25 $m^2/g$ unfavorably increases noise, and exceeding 100 $m^2/g$ undesirably deteriorates the surface properties. The coercive force is preferably 500 to 4,000 Oe, and more preferably 1,200 to 3,000 Oe. A coercive force of less than 500 Oe undesirably lowers the short-wavelength output, and a coercive force of more than 4,000 Oe undesirably causes difficulty of recording with a head. The saturation magnetization ($\sigma s$) is generally 50 emu/g or more, and preferably 60 emu/g or more. The tap density is preferably 0.5 g/ml or more, and more preferably 0.8 g/ml or more.

Examples of the tabular ferromagnetic hexagonal ferrite particles which can be used in the present invention include substituted ferrites such as barium ferrite, strontium ferrite, lead ferrite and calcium ferrite, Co-substituted ferrites, and hexagonal Co particles. The concrete examples of the above ferrites include magnetoplumbite-type barium ferrite, magnetoplumbite-type strontium ferrite, and magnetoplumbite-type barium or strontium ferrite partially comprising a spinel phase. Besides the atoms specified above, the ferromagnetic ferrite particles may contain other atoms such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge and Nb.

Generally, the ferromagnetic ferrite particles containing elements such as Co-Ti, Co-Ti-Zr, Co-Ti-Zn, Ni-Ti-Zn and Ir-Zn can be used. Particularly preferred among these ferrite particles are Co-substituted barium ferrite and Co-substituted strontium ferrite.

In order to reduce SFD of the uppermost magnetic layer of the present invention to 0.3 or less, the coercive force distribution needs to be narrow. Examples of the method for controlling the coercive force include a method which comprises providing uniform particle size and particle thickness, a method which comprises controlling the thickness of the spinel phase in the hexagonal ferrite to a predetermined value, a method which comprises controlling the amount of substituent elements in the spinel phase to a predetermined value, and a method which comprises predetermining the substitution site of the spinel phase.

Hexagonal ferrites used in the present invention usually are hexagonal tabular particles, and the particle size thereof, which means the width of the hexagonal plate, is measured with an electron microscope.

In the magnetic recording media of the present invention, methods for controlling the magnetic orientation of the tabular ferromagnetic hexagonal ferrite particles and the glossiness of the magnetic layers within the above-described range include the following methods. Two or more of these methods are preferably used in combination. However, methods for obtaining the magnetic recording media of the present invention are not limited thereto of course.

(1) The tabular ferromagnetic hexagonal ferrite particles having a tabular ratio of 3 to 7 are used.

(2) Orientation is conducted in a magnetic field of 5,000 G (gausses) or more.

(3) Drying air is passed through a magnetic zone to complete drying in a magnetic field.

(4) The amount of a solvent contained in a magnetic coating is adjusted to 250% or more of the amount of the tabular ferromagnetic hexagonal ferrite particle.

(5) A surface of the magnetic layer is formed by pressing (i.e., calender-processing) with metallic rolls at a temperature of 100° C. or more at a line pressure of 300 kg/cm or more.

In method (1) described above, if the tabular ratio is more than 7, the number of particles per longitudinal unit length is apt to be more than that per width unit length. Conversely, however, rotation of the magnetic particles due to orientation thereof are liable to produce spaces, which unfavorably lowers the longitudinal glossiness. On the other hand, if the tabular ratio is less than 3, the number of particles per longitudinal unit length decreases, undesirably causing the longitudinal glossiness to be lowered. A tabular ratio of 3 to 7 easily provide the longitudinal glossiness desired in the present invention. However, this is closely related to the solvent amount described in (4). Namely, even if the tabular ratio exceeds 7, the object of the present invention can be attained by increasing the solvent amount to facilitate the rotation of the magnetic particles due to the orientation thereof.

In method (2), the magnetic particles are longitudinally densely arranged, thereby increasing the glossiness. The magnetic field of 5,000 G or more can be obtained by a solenoid magnet, a permanent magnet or a superconductive magnet.

In method (3), the drying air in the magnetic zone is usually heated to 60° C. or more, and the residence time can be controlled by the zone length and the coating speed, thereby completing the drying in the magnetic field. Thus, the magnetic particles are longitudinally densely arranged to increase the longitudinal glossiness, thereby achieving the object of the present invention.

In method (4), the tabular magnetic particles can rotate without mutual interference during the orientation. The magnetic particles are therefore longitudinally densely arranged to increase the glossiness, thereby achieving the object of the present invention.

In method (5), the glossiness in longitudinal or width direction can be raised, thereby achieving the object of the present invention.

When the magnetic layer containing the acicular ferromagnetic particles is placed under the magnetic layer containing the tabular ferromagnetic hexagonal ferrite particles in the present invention, the acicular ratio of the acicular ferromagnetic particles is desirably 4 to 12, more desirably 5 to 10, and most desirably 6 to 8. If the acicular ratio is too low, the orientation of the ferromagnetic undesirably decreases, and it is too high, the filling degree of the ferromagnetic particle unfavorably decreases.

As the ferromagnetic particle to be incorporated into the magnetic layer of the present invention there can be used a known ferromagnetic particle such as magnetic iron oxide $\gamma$-FeOx (in which x=1.33 to 1.5) particle, Co-modified $\gamma$-FeOx (in which x=1.33 to 1.5) particle, ferromagnetic alloy fine particle comprising Fe, Ni or Co as main component (75% or more), and acicular barium ferrite particle. Particularly preferred among these ferromagnetic particles is ferromagnetic alloy particle comprising $\alpha$-Fe as main component and Co-modified $\gamma$-FeOx. Such a ferromagnetic particle may further contain atoms other than predetermined atoms, such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge and Nb. Such a ferromagnetic particle may be treated with a dispersant, lubricant, surface active agent or antistatic agent (as described later) before dispersion. This is further described in JP-B-44-14090, JP-B-45-18372, JP-B-47-22062, JP-B- 47-22513, JP-B-46-28466, JP-B-46-38755, JP-B-47-4286, JP-B-47-12422, JP-B-47-17284, JP-B-47-18509, JP-B-47-18573, JP-B- 39-10307, and JP-B-48-39639 (the term "JP-B" as used herein means an "examined Japanese patent publication"), and U.S. Pat. Nos. 3,026,215, 3,031,341, 3,100,194, 3,242,005, and 3,389,014.

Among the above mentioned ferromagnetic particles, the ferromagnetic alloy fine particle may contain a small amount of hydroxide or oxide. In order to prepare such a ferromagnetic alloy fine particle, known preparation methods can be used. These methods include a method which comprises reduction with a composite organic acid salt (mainly oxalate) and a reducing gas such as hydrogen; a method which comprises reduction of iron oxide with a reducing gas such as hydrogen to obtain Fe or Fe-Co particles; a method which comprises pyrolysis of a metallic carbonyl compound; a method which comprises adding a reducing agent such as sodium borohydride, hypophosphite and hydrazine to an aqueous solution of a ferromagnetic metal to reduce the ferromagnetic metal; and a method which comprises evaporation of a metal in an inert gas under reduced pressure to obtain a finely divided particle. The ferromagnetic ally particle thus obtained may be subjected to a known gradual oxidation treatment such as a process which comprises dipping the ferromagnetic alloy particle into an organic solvent and then drying the material, a process which comprises dipping the ferromagnetic alloy particle into an organic solvent with an oxygen-containing gas bubbled thereinto to form an oxide film on the surface of the ferromagnetic alloy particle and then drying the material, and a process which comprises controlling the partial pressure of oxygen gas and inert gas instead of using an organic solvent to form an oxide film on the surface of the ferromagnetic alloy particle.

The ferromagnetic particle to be incorporated in the upper magnetic layer of the present invention exhibits a specific surface area of generally 25 to 80 $m^2/g$, preferably 40 to 70 $m^2/g$ as determined by FET method. If the specific surface area falls below 25 $m^2/g$, the resulting magnetic recording medium has a high noise. On the contrary, if the specific surface area exceeds 80 $m^2/g$, the desired surface properties cannot be easily obtained. The magnetic iron oxide particle exhibits saturated magnetization ($\sigma$s) of generally 50 emu/g or more, preferably 70 emu/g or more. In the case of ferromagnetic metal particle, it is preferably in the range of 100 emu/g or more, more preferably from 110 emu/g to 170 emu/g. The ferromagnetic particle exhibits a coercive force of generally 500 Oe or more, preferably 500 Oe to 2500 Oe, more preferably from 800 Oe to 2,000 Oe. The tap density of $\gamma$-iron oxide is preferably in the range of 0.5 g/ml or more, more preferably 0.8 g/ml or more. In the case of alloy particle, it is preferably in the range of 0.2 to 0.8 g/ml. If it exceeds 0.8 g/ml, the ferromagnetic particle can be easily oxidized during compaction, making it difficult to obtain sufficient saturated magnetization ($\sigma$s). On the contrary, if it falls below 0.2 ml/g, the dispersibility of the ferromagnetic particle can be insufficient.

If $\gamma$-iron oxide is used, the ratio of the divalent iron to the trivalent iron is preferably in the range of 0 to 20%, more preferably 5 to 10%. The proportion of cobalt atom to iron atom is in the range of 0 to 15%, preferably 2 to 8%.

The preferable characteristics other then the above characteristics of the tabular ferromagnetic hexagonal ferrite particles and acicular ferromagnetic particles which can be used in the present invention are shown below.

The crystallite size of the ferromagnetic particles of the present invention is in the range of generally 50 to 450 Å, preferably 100 to 350 Å.

The ferromagnetic particle preferably exhibits r1500 of 1.5 or less, more preferably 1.0 or less. The r1500 indicates the percentage of magnetization left uninverted in a magnetic recording medium which has been magnetized to saturation when it is in a magnetic field of 1500 Oe in the opposite direction.

The ferromagnetic particle preferably exhibits a water content of 0.01 to 2%. The water content of the ferromagnetic particle is preferably optimized by the kind of the binder to be used in combination therewith.

The pH value of the ferromagnetic particle is preferably optimized by the kind of binder to be used. The pH value of the ferromagnetic particle is in the range of 4 to 12, preferably 6 to 10. The ferromagnetic particle may be subjected to surface treatment with Al, Si, P or oxide thereof as necessary. The surface treatment using $Al_2O_3$ or $SiO_2$ is preferred. The amount of $Al_2O_3$ or $SiO_2$ used is preferably optimized by the kind of the binder to be used in combination therewith. The amount of such a surface treatment is in the range of 0.1 to 10%. The adsorption of a lubricant such as aliphatic acid by the ferromagnetic particle thus surface-treated is advantageously in the range of 100 $mg/m^2$. The acicular ferromagnetic particle may contain soluble inorganic ions such as Na, Ca, Fe, Ni and Sr ions in some cases. If the content of such an inorganic ion is 500 ppm or less, there are no remarkable effects on the properties.

The ferromagnetic particle to be used in the present invention preferably has as small a void as possible, i.e., generally 20 vol % or less, more preferably 5 vol % or less.

It is preferred that the above-described non-magnetic layers and magnetic layers in the magnetic recording media of the present invention each have a center line average surface roughness (Ra) of 0.006 μm or less, when they are formed independently. The above center line average surface roughness (Ra) is measured as a Ra value of an area of 250 nm×250 nm with the MIRAU method by using "TOP 03D" (manufactured by WYKO Co., Ltd.). The roughness is spherical-compensated and cylindrical-compensated at the measuring wavelength of 650 nm. This system is to use a non-contact surface roughness meter using the interference of light.

The non-magnetic powders used in the above-described non-magnetic layers in the magnetic recording media of the present invention can be selected from, for example, inorganic compounds such as metal oxides, metal carbonates, metal sulfates, metal nitrides, metal carbides and metal sulfides. Examples of the inorganic compounds which can be used alone or in combination include m-alumina having an α-conversion of 90% or more, β-alumina, γ-alumina, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate and molybdenum disulfide. Among these, titanium dioxide, zinc oxide, α-iron oxide and barium sulfate are preferred, because of their good dispersibility, and titanium dioxide is particularly preferred. It is preferred that these non-magnetic powders have a particle size of 0.005 to 2 μm. However, non-magnetic powders different in particle size may be combined, or the particle size distribution of a single non-magnetic powder may be broadened to give the same effect, if needed. It is particularly preferred that the particle size is 0.01 to 0.2 μm. The tap density is generally 0.05 to 2 g/ml, and desirably 0.2 to 1.5 g/ml. The water content is generally 0.1 to 5%, and desirably 0.2 to 3%. The pH is usually 2 to 11, and particularly desirably ranges from 6 to 9. The specific surface area is 1 to 100 $m^2/g$, desirably 5 to 50 $m^2/g$, and more desirably 7 to 40 $m^2/g$. The crystallite size 2 is desirably 0.01 to 2 μm. The oil adsorption as measured by the DBP method is 5 to 100 ml/100 g, desirably 10 to 80 ml/100 g, and more desirably 20 to 60 ml/100 g. The specific gravity is 1 to 12, and preferably 3 to 6. The shape may be any of the acicular, spherical, polyhedral and tabular forms. The ignition loss is desirably 20% or less. It is desirable that the above-described inorganic powders used in the present invention has a Mohs' hardness of 4 or more. The surface roughness factor of these particles is desirably 0.8 to 1.5, and more desirably 0.9 to 1.2. The SA adsorption is 1 to 20 μmol/$m^2$ and more desirably 2 to 15 μmol/$m^2$. It is desirable that the heat of wetting of the non-magnetic particles contained in the lower layers to water at 25° C. is within the range of 200 to 600 erg/$cm^2$. Solvents having the heat of wetting within this range can be used. The amount of water molecules on the surfaces at 100° to 400° C. is suitably 1 to 10 molecules/100 Å. It is preferred that the pH at the isoelectric point in water ranges from 3 to 6. These particles are desirably surface treated with $Al_2O_3$, $SiO_2$, $TiO_2$, $ZrO_2$, $SnO_2$, $Sb_2O_3$ or ZnO. In particular, $Al_2O_3$, $SiO_2$, $TiO_2$ and $ZrO_2$ are desirable for dispersibility, and $Al_2O_3$, $SiO_2$ and $ZrO_2$ are more desirable. These may be used alone or in combination. The surface-treated layer may be formed by co-precipitation, or the particle may be first treated with alumina, followed by treatment on its surface with silica, or may be treated in the reverse order, according to the purposes. The surface-treated layer may be porous according to the purposes, but it is generally preferred to be uniform and dense.

Specific examples of the non-magnetic particle to be used in the present invention include UA5600, UA5605 and Nanotite (manufactured by Showa Denko K.K.); AKP-20, AKP-30, AKP-50, HIT-55, HIT-100, and ZA-Gl (manufactured by Sumitomo Chemical Co., Ltd.); G5, G7, and S-1 (manufactured by Nippon Chemical Industrial Co., Ltd.); TF-100, TF-120, TF-140, R516, DPN250 and DPN250BX manufactured by Toda Kogyo Co., Ltd.; TTO-51B, TTO-55A, TTO-55B, TTO-55C, TTO-55S, TTO-55D, FT- 1000, FT-2000, FTL-100, FTL-200, M-1, S-1, SN-100, R-820, R-830, R-930, R-550, CR-50, CR-80, R-680, and TY-50 (manufactured by Ishihara Sangyo Kaisha Ltd.); ECT-52, STT- 4D, STT-30D, STT-30, and STT-65C (manufactured by Titan Kogyo K.K.); T-1 (manufactured by Mitsubishi Material Co., Ltd.); NS-0, NS-3Y, and NS-8Y (manufactured by Nippon Shokubai Kagaku Kogyo Co., Ltd.); MT-100S, MT-100T, MT-150W, MT-500B, MT-600B, and MT-100E (manufactured by Teika K.K.); FINEX-25, BF-1, BF-10, BF-20, BF-1L, and BF-10P (manufactured by Sakai Chemical Industry Co., Ltd.); DEFIC-Y, and DEFIC-R (manufactured by Dowa Mining Co., Ltd.); and Y-LOP (manufactured by Titan Kogyo K.K.); and its calcined product.

As the non-magnetic particle to be used in the present invention, titanium oxides (titanium dioxide in particular) are particularly preferred. The process for the preparation of titanium oxides is further described. Processes for the preparation of titanium oxides can be roughly divided into two processes, i.e., the sulfuric acid process and the chlorine process.

In the sulfuric acid process, illuminite ore is distilled in sulfuric acid to extract Ti, Fe and etc., therefrom in the form of sulfate. Iron sulfate is then removed by crystallization. The remaining titanyl oxide solution is purified by filtration and heat-hydrolyzed to precipitate hydrous titanium oxide. The hydrous titanium oxide is filtered off and then washed. Impurities are then removed from the material by washing. A grain diameter adjustor or the like is added to the material. The material is then calcined at a temperature of 80° to 1,000° C. to produce crude titanium oxide. Rutile or anatase titanium oxide can be selected by the kind of nucleating agent to be added during hydrolysis. The crude titanium oxide is then subjected to grinding, granulation, surface treatment, etc., to prepare the desired non-magnetic particle.

In the chlorine process, natural rutile ore or synthetic rutile is used. The ore is chlorinated at an elevated temperature in a reducing atmosphere to convert Ti to $TiCl_4$ and Fe to $FeCl_2$. After cooling, the resulting solid iron oxide is separated from the liquid $TICl_4$. The crude $TiCl_4$ thus obtained is then rectified. A nucleating agent is then added to the material. The material is momentarily reacted with oxygen at a temperature of 1,000° C. or higher to obtain crude titanium oxide. The crude titanium oxide produced in the oxidative decomposition process is then subjected to finishing for pigment properties in the same manner as in the sulfuric acid process.

In surface treatment, after dry pulverization of the above-described titanium oxide material, water and a dispersing agent are added thereto, and the resulting dispersion is subjected to wet pulverization and centrifugation to classify coarse particles. Then, the fine particle slurry is transferred into a surface treating tank, and surfaces of the particles are coated with a metal hydroxide herein. First, an aqueous solution of a salt of Al, Si, Ti, Zr, Sb, Sn or Zn is added in a determined amount, and then, an acid or an alkali for neutralizing the solution is added to coat the surfaces of titanium oxide particles with the resulting hydrous oxide. The water-soluble salt obtained as a by-product is removed by decantation, filtration and washing. The pH of the slurry is finally adjusted, and filtration is conducted, followed by washing with pure water. The washed cake is dried with a spray dryer or a band dryer. Finally, the resulting dried product is pulverized with a jet mill to produce a product. Further, in addition to the aqueous treatment, it is also possible to conduct surface treatment with Al and Si by passing $AlCl_3$-$SiCl_4$ vapor through the titanium oxide particle and then allowing steam to flow therein. For methods for producing other pigments, reference can be made to *Characterization of Particle Surfaces*, Academic Press.

In the present invention, the non-magnetic layer may comprises carbon black to attain known effects, e.g., reduction of Rs (electrical surface resistivity). This carbon black can be furnace black for rubber, thermal black for rubber, black for color, acetylene black, etc. Such carbon black preferably has a specific surface area of 100 to 500 $m^2/g$, more preferably 150 to 400 $m^2/g$, DBP oil adsorption of 20 to 400 ml/100 g, more preferably 30 to 200 ml/100 g, average grain diameter of 5 mµ to 80 mµ, more preferably 10 mµ to 50 mµ, most preferably 10 mµ to 40 mµ, pH value of 2 to 10, water content of 0.1 to 10%, and tap density of 0.1 to 1 g/ml.

Specific examples of carbon black to be used in the present invention include BLACKPEARLS 2000, 1300, 1000, 900, 800, 880, 700, VULCAN and XC-72 (produced by Cabot Co., Ltd.); #3050, #3150, #3250, #3750, #3950, #950, #970, #850, #650, and MA-600 (produced by Mitsubishi Chemical Corporation); CONDUCTEX SC (produced by Columbia Carbon Co., Ltd.); 8800, 8000, 7000, 5750, 5250, 3500, 2100, 2000, 1800, 1500, 1255, and 1250 (produced by RAVEN Co., Ltd.); and Ketjen Black EC (produced by Agzo Co., Ltd.). These carbon blacks may be surface-treated with a dispersant, grafted with a resin or partially graphtized before use. These carbon blacks may be previously dispersed in a binder before being added to the non-magnetic coating solution. These carbon blacks may be used singly or in combination.

The above blacks can be preferably used in the range of less then 50% by weight of the above non-magnetic particles, and further can be preferably used in the range of less than 40% by weight of the total weight of the non-magnetic layer.

For carbon blacks which can be used in the present invention, reference can be made to "Handbook of Carbon Black", Carbon Black Kyokai.

Organic particles which can be used as the non-magnetic particles in the non-magnetic layers of the magnetic recording media of the present invention include acrylstyrene resin particles, benzoguanamine resin particles, melamine resin particles and phthalocyanine resin pigment particles. Polyolefinic resin particles, polyester resin particles, polyamide resin particles, polyimide resin particles and polyethylene fluoride resin particles can also be used. They can be produced by methods as described in JP-A- 62-18564 and JP-A-60-255827.

For the thickness of each layer constituting the magnetic recording medium of the present invention, the non-magnetic support has a thickness of generally 1 to 100 µm and desirably 4 to 20 µm, and the total thickness of the magnetic layer and the non-magnetic layer is within the range of 1/100 to two times that of the non-magnetic support. Further, an undercoating layer for improvement of adhesion may be formed between the non-magnetic support and the non-magnetic layer or the magnetic layer. The thickness of the undercoating layer is generally 0.01 to 2 µm, and preferably 0.02 to 0.5 µm. In addition, a backing layer may be provided on the surface of the non-magnetic support opposite to the magnetic layer. The thickness of the backing layer is generally 0.1 to 2 µm, and desirably 0.3 to 1.0 µm. As the undercoating layer and the backing layer, known ones can be used.

The same binders, lubricants, dispersing agents, additives, solvents, dispersing methods, etc. as used in the magnetic layers are used for the non-magnetic layers. In particular, for the amounts and kinds of binders, additives, the amounts and kinds of dispersing agents, known techniques used in the magnetic layers are applicable.

The thickness of the non-magnetic layer is generally 0.2 to 5 µm, and preferably 1 to 3 µm.

In the present invention, the non-magnetic layers mainly comprises non-magnetic particles, but they may contain small amounts (20% by weight or less based on the non-magnetic particles) of ferromagnetic particles as long as the effect of the present invention is exhibited. The ferromagnetic particles exceeding 20% by weight results in loss of the effect of the present invention.

The binder resin, to be incorporated in the non-magnetic layer, the first magnetic layer and the second magnetic layer in the magnetic recording medium of the present invention, include: known thermoplastic resins, thermosetting resins, reactive resins or mixtures thereof. Thermoplastic resins include those having a glass transition temperature of $-100°$ C. to 150° C., a number-average molecular weight of 1,000 to 200,000, preferably 10,000 to 100,000, and polymerization degree of about 50 to 1,000. Examples of such thermoplastic resins include: polymers or copolymers containing as constituent units vinyl chloride, vinyl acetate, vinyl alcohol, maleic acid, acrylic acid, acrylic acid ester, vinylidene chloride, acrylonitrile, methacrylic acid, methacrylic acid ester, styrene, butadiene, ethylene, vinyl butyral, vinyl acetal, vinyl ether, etc., polyurethane resins, and various rubber resins. Examples of the above mentioned thermosetting resins or reactive resins include phenol resin, epoxy resin, polyurethane hardening resin, urea resin, melamine resin, alkyd resin, acrylic reactive resin, formaldehyde resin, silicone resin, epoxy-polyamide resin, mixture of polyester resin and isocyanate prepolymer, a mixture of polyester polyol and polyisocyanate, and a mixture of polyurethane and polyisocyanate.

These resins are further described in "Plastic Handbook", Asakura Shoten,

Further, known electron radiation curing resins can be incorporated into each the layers. Examples of these resins and their preparation methods are further described in JP-A-62-256219.

These resins can be used singly or in combination. Preferred examples of such a combination of resins include a combination of at least one selected from vinyl chloride resin, vinyl chloride-vinyl acetate resin, vinyl chloride-vinyl acetate-vinyl alcohol resin and vinyl chloride-vinyl acetate-maleic anhydride copolymer with a polyurethane resin, and a combination thereof with polyisocyanate.

Examples of the structure of polyurethane resins which can be used in the present invention include known structures such as polyester polyurethane, polyether polyurethane, polyether polyester polyurethane, polycarbonate polyurethane, polyester polycarbonate polyurethane and polycaprolactone polyurethane.

Of all these binders, those in which at least one polar group selected from —COOM, —$SO_3M$, —$OSO_3M$, —P=$O(OM)_2$, —OP=$O(OM)_2$, —$NR_4X$ (in which M represents a hydrogen atom and an alkali metal salt group), OH, NR², N⁺R³ (in which R is a hydrocarbon group), epoxy group, SH and CN has been introduced by copolymerization or addition reaction may be optionally used to obtain better dispersibility and durability. The amount of such a polar group is in the range of generally $1 \times 10^{-1}$ to $1 \times 10^{-8}$ mole/g, preferably $1 \times 10^{-2}$ to $1 \times 10^{-6}$ mole/g.

Specific examples of these binders to be used in the present invention include VAGH, VYHH, VMCH, VAGF, VAGD, VROH, VYES, VYNC, VMCC, XYHL, XYSG, PKHH, PKHJ, PKHC, and PKFE (manufactured by Union Carbide Co., Ltd.); MPR-TA, MPR-TA 5, MPR-TAL, MPR-TSN, MPR-TMF, MPR-TS, MPR-TM and MPR-TAO (manufactured by Nisshin Chemical Industry Co., Ltd.); 1000W, DX80, DX81, DX82, DX83 and 100FD (manufactured by Electro Chemical Industrial Co., Ltd.); MR105, MR110, MR100, and 400X110A (manufactured by Nippon Zeon Co., Ltd.); Nippollan N2301, N2302 and N2304 (manufactured by Nippon Polyurethane Co., Ltd.); Pandex T-5105, T-R3080 and T-5201, Barnock D-400 and D-210-80, and Crisvon 6109 and 7209 (manufactured by Dainippon and Chemicals Inc.); Vylon UR8200, UR8300, UR8600, UR5500, UR4300, RV530 and RV280 (manufactured by Toyobo Co., Ltd.); Daipheramine 4020, 5020, 5100, 5300, 9020, 9022 and 7020 (manufactured by Dainichi Seika Co., Ltd.); MX5004 (manufactured by Mitsubishi Chemical Corporation); Sunprene SP-150, TIM3003 and TIM3005 (manufactured by Sanyo Chemical Industries Co., Ltd.); and Salan F310 and F210 (manufactured by Asahi Chemical Industry Co., Ltd.).

The content of the above binder resin is normally in the range of 5 to 50% by weight, preferably 10 to 35% by weight based on the weight of the non-magnetic particle or ferromagnetic particle. If a vinyl chloride resin is to be used, its content is preferably in the range of 5 to 30% by weight. If a polyurethane resin is to be used, its content is preferably in the range of 2 to 20% by weight. If a polyisocyanate is to be used, its content is preferably in the range of 2 to 20% by weight. These binder resins are preferably used in these amounts in combination.

In the present invention, if polyurethane is used, its glass transition temperature, breaking extension, breaking stress and yield point are preferably in the range of −50° C. to 100° C., 100 to 2000%, 0.05 to 10 kg/cm² and 0.05 to 10 kg/cm², respectively.

The magnetic recording medium of the present invention comprises at least two layers. It is therefore possible, of course, to vary the amounts of binders, the amounts of vinyl chloride resins, polyurethane resins, polyisocyanates or other resins, contained in the binders, the molecular weights of resins forming the magnetic layers, the amounts of polar groups, or the physical characteristics of the resins described above, in the non-magnetic layer, the first magnetic layer and the second magnetic layer, if desired. Techniques known in the art of multiple magnetic layers can be applied. For example, when the amount of binder is varied in each layer, it is effective to increase the amount of binder in the second magnetic layer for a reduction in abrasion on a surface of the magnetic layer. In order to improve head touch to a head, the amount of binder in the second magnetic layer or in the non-magnetic layer is increased to give flexibility, thereby achieving the object.

Examples of polyisocyanates which can be used in the present invention include isocyanates such as tolylenediisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate and triphenylmethane triisocyanate, products of the reaction of these isocyanates with polyalcohols, and polyisocyanates produced by the condensation of isocyanates. Examples of the trade names of these commercially available isocyanates include Coronate L, Coronate HL, Coronate 2030, Coronate 2031, Millionate MR and Millionate MTL (manufactured by Nippon Polyurethane Co., Ltd.); Takenate D-102, Takenate D-110N, Takenate D-200 and Takenate D-202 (manufactured by Takede Chemical Industries, Co., Ltd.); and Desmodur L, Desmodur IL, Desmodur N and Desmodur HL (manufactured by Sumitomo Bayer Co., Ltd.); These isocyanates may be used singly. Alternatively, by making the best use of the difference in their hardening reactivity, two or more of these isocyanates can be used in combination in each the magnetic layers.

In order to retain the characteristics of the magnetic recording medium, additives having several functions such as lubricating agents, abrasives, dispersing agents, electric conducting agents and anti-molding agents other than the ferromagnetic particles and binder as a main component can be added to the magnetic layer of the magnetic recording medium of the present invention.

The additives to be used in the present invention can be those having a lubricating effect, an antistatic effect, a dispersing effect, a plasticizing effect, etc. For example, molybdenum disulfide, tungsten disulfide, graphite, boron nitride, fluorinated graphite, silicone oil, silicone having a polar group, aliphatic acid-modified silicone, fluorine-containing silicone, fluorine-containing alcohol, fluorine-containing ester, polyolefin, polyglycol, alkylphosphoric acid ester and alkaline metal salt thereof, alkylsulfuric acid ester and alkaline metal salt thereof, polyphenyl ether, fluorine-containing alkylsulfric acid ester and alkaline metal salt thereof, monoaliphatic ester, dialiphatic ester or trialiphatic ester of monobasic aliphatic acid with 10 to 24 carbon atoms (which may contain an unsaturated bond or may be branched) and salt thereof with metals (e.g., Li, Na, K, Cu), monovalent, divalent, trivalent, tetravalent, pentavalent and hexavalent alcohol with 12 to 22 carbon atoms (which may contain an unsaturated bond or may be branched), alkoxy alcohol with 12 to 22 carbon atoms or monobasic aliphatic acid with 10 to 24 carbon atoms (which may contain an unsaturated bond or may be branched) with one of monovalent, divalent, trivalent, tetravalent, pentavalent and hexavalent alcohols with 2 to 12 carbon atoms (which may contain an unsaturated bond or may be branched), aliphatic ester of monoalkyl ether of alkylene oxide polymer, aliphatic amide with 8 to 22 carbon atoms, aliphatic amine with 8 to 22 carbon atoms, etc., can be used. Specific examples of such additives include lauric acid, myristic acid, palmitic acid, stearic acid, behenic acid, butyl stearate, oleic acid, linoleic acid, linolenic acid, elaidic acid, octyl stearate, amyl stearate, isooctyl stearate, octyl myristate, butoxyethyl stearate, anhydrosorbitan monostearate, anhydrosorbitan distearate, anhydrosorbitan tristearate, oleyl alcohol, and lauryl alcohol.

Further, nonionic surface active agents such as alkylene oxide, glycerin, glycidol and alkylphenolethylene oxide addition product; cationic surface active agents such as cyclic amine, ester amide, quaternary ammonium salt, hydantoin derivative, heterocyclic compound, phosphonium and sulfonium; anionic surface active agents containing polar groups such as carboxylic acid, sulfonic acid, phosphoric acid, ester sulfate and ester phosphate; amphoteric surface active agents such as amino acid, aminosulfonic acid, sulfuric or phosphoric ester of amino alcohol and alkylbetaine, etc., can be used. These surface active agents are further described in "Kaimen Kasseizai Binran (Handbook of Surface Active Agents)", Sangyo Tosho K.K. These lubricants, antistatic agents, etc., need not be necessarily 100% pure, but may contain impurities such as isomer, unreacted material, by-product, decomposition product and oxide. The concentration of these impurities is preferably in the range of 30% or less, more preferably 10% or less.

These lubricating agents and surface active agents to be used in the present invention may be varied in their kind and content from the non-magnetic layer to the magnetic layer as is necessary. For example, aliphatic acids may be varied in their melting points from the non-magnetic layer to the magnetic layer to control the oozing thereof to the surface. Ester may be varied in their boiling points or polarity from the lower non-magnetic layer to the magnetic layer to control the oozing thereof to the surface. The content of surface active agents may be controlled to improve the coating stability. The content of a surface active agent in the interlayer may be higher than that in the magnetic layer to improve the lubricating effect. The present invention is not limited to these examples.

The additives to be used in the present invention may be entirely or partially added to the system at any steps during the preparation of the magnetic and non-magnetic coating solutions. For example, these additives may be mixed with magnetic particles before kneading. Further, these additives may be added to the system at the step of kneading magnetic particles with a binder and a solvent. Alternatively, these additives may be added to the system during or after the dispersion step or immediately before the coating step. In some cases, after coating of the magnetic layer depending on the purposes, the additive is all or partly applied by concurrent or sequential coating to attain the object. According to the purposes, after calendering treatment or after termination of slitting, the surface of the magnetic layer can also be coated with a lubricant.

Examples of the tradename of these lubricants to be used in the present invention include NAA-102, NAA-415, NAA-312, NAA-160, NAA-180, NAA-174, NAA-175, NAA-222, NAA-34, NAA-35, NAA-171, NAA-122, NAA-142, NAA-160, NAA-173K, castor oil hardened fatty acid, NAA-42, NAA-44, Cation SA, Cation MA, Cation AB, Cation BB, Nymeen L-201, Nymeen L-202, Nymeen S-202, Nonion E-208, Nonion P-208, Nonion S-207, Nonion K- 204, Nonion NS-202, Nonion NS-210, Nonion HS-206, Nonion L-2, Nonion S-2, Nonion S-4, Nonion O-2, Nonion LP-20R, Nonion PP- 40R, Nonion SP-60R, Nonion OP-80R, Nonion OP-85R, Nonion LT- 221, Nonion ST-221, Nonion OT-221, Monogly MB, Nonion DS-60, Anon BF, Anon LG, butyl stearate, butyl laurate, and erucic acid (manufactured by Nippon Oils And Fats Co., Ltd.); oleic acid (manufactured by Kanto Chemical Co., Ltd.); FAL-205 and FAL-123 (manufactured by Takemoto Yushi Co., Ltd.); Enujerubu LO, Enujerubu IPM and Sansosyzer E4030 (manufactured by Shin Nihon Rika Co., Ltd.); TA-3, KF-96, KF-96L, KF-96H, KF-410, KF-420, KF-965, KF-54, KF-50, KF-56, KF-907, KF-851, X-22- 819, X-22-822, KF-905, KF-700, KF-393, KF-857, KF-860, KF- 865, X-22-980, KF-101, KF-102, KF-103, X-22-3710, X-22-3715, KF-910, and KF-3935 (manufactured by The Shin-Etsu Chemical Co., Ltd.); Armide P, Armide C, and Armoslip CP (manufactured by Lion Armor Co., Ltd.); Duomine TDO (manufactured by Lion Fat and Oil Co., Ltd.); BA-41G (manufactured by The Nisshin Oil Mills Co., Ltd.); and Profan 2012E, Newpole PE61, Ionet MS-400, Ionet MO-200, Ionet DL-200, Ionet DS-300, Ionet DS 1000, and Ionet DO-200 (manufactured by Sanyo Chemical Co., Ltd.).

Specific examples of abrasives to be used in the upper magnetic layer of the present invention include $\alpha$-alumina having an alpha conversion of 90% or more, $\beta$-alumina, silicon carbide, chromium oxide, cerium oxide, $\alpha$-iron oxide, corundum, artificial diamond, silicon nitride, silicon carbide, titanium carbide, titanium oxide, silicon dioxide, and boron nitride. In general, known materials having a Mohs' hardness of 6 or more are used singly or in combination. A composite material made of these abrasives (abrasive surface-treated with another abrasive) may be used. These abrasives may contain compounds or elements other than the main component, but exert similar effects provided that the content of the main component is not less than 90% by weight. The grain size of these abrasives is preferably in the range of 0.01 to 2 $\mu$m. If necessary, a plurality of abrasives having different grain sizes may be used in combination or a single abrasive having a wide grain diameter distribution may be used to provide similar effects. The tap density of these abrasives is preferably in the range of 0.3 to 2 g/ml. The water content of these abrasives is preferably in the range of 0.1 to 5%. The pH value of these abrasives is preferably in the range of 2 to 11. The specific surface area of these abrasives is preferably in the range of 1 to 30 $m^2$/g. The abrasives to be used in the present invention may be in the form of an acicular, spherical or die-like shape. The abrasives to be used in the present invention may preferably have edges partially on the surface thereof to provide a high abrasion.

Specific examples of abrasives to be used in the present invention include AKP-20A, AKP-30, AKP-50, HIT-50 and HIT-100 (manufactured by Sumitomo Chemical Co., Ltd.); G5, G7, and S-1 (manufactured by Nippon Chemical Industrial Co., Ltd.); and TF-100 and TF-140 (manufactured by Toda Kogyo Co., Ltd.). The abrasives to be used in the present invention can be varies in kind, content and combination from the first layer, the second layer and the interlayer, depending on the purpose. These abrasives may be incorporated into the magnetic coating solution in the form of a dispersion in a binder. The abrasives which are present in the surface and edge surface of the magnetic layer of the magnetic recording medium in the present invention is preferably 5 abrasives or more per 100 $\mu m^2$ of the surface and edge surface of the magnetic layer.

The carbon black to be incorporated into the magnetic layer can be furnace black for rubber, thermal black for rubber, black for color, acetylene black, etc. Such carbon black preferably has a specific surface area of 5 to 500 $m^2$/g, DBP oil adsorption of 10 to 400 ml/100 g, average grain diameter of 5 m$\mu$ to 300$\mu$, pH value of 2 to 10, water content of 0.1 to 10% by weight, and tap density of 0.1 to 1 g/ml. Specific examples of carbon black to be used in the present invention include BLACKPEARLS 2000, 1300, 1000, 900, 800, 700, VULCAN and XC-72 (produced by Cabot Co., Ltd.); #80, #60, #55, #50, and #35 (produced by Asahi Carbon Co., Ltd.); #2400B, #2300, #900, #1000, #30, #40, and #10B (produced by Mitsubishi Chemical Corporation); CONDUCTEX SC and RAVEN 150, 50, 40 and 15 (produced by Columbia Carbon Co., Ltd.). These carbon blacks may be surface-treated with a dispersant, grafted with a resin or partially graphtized before use. These carbon blacks may be previously dispersed in a binder before being added to the non-magnetic coating solution. These carbon blacks may be used singly or in combination. If carbon black is to be used, its content is preferably in the range of 0.1 to 30% by weight based on the weight of ferromagnetic particle. Carbon black serves to inhibit the electrification of the magnetic layer, reduce the frictional coefficient, provide light screening effect, enhance the film strength, etc. These functions vary with the kind of carbon black used. These carbon blacks may be different in kind, content and combination from the lower non-magnetic layer and the upper magnetic layer depending on the previously specified properties such as particle size, oil adsorption, electrical conductivity and pH. For carbon blacks which can be incorporated into the magnetic layer of the present invention, reference can be made to "Handbook of Carbon Black", Carbon Black Kyokai.

The non-magnetic support to be used in the present invention can be any known film such as polyester, e.g., polyethylene terepthalate and polyethylene naphthalate; polyolefin, cellulose triacetate, polycarbonate, polyamide, polyimide, polyamide imide, polysulfon, aramide, aromatic polyamide and polobenzoxazole. Particularly, when the thin non-magnetic support having a thickness of 10 μm or less is used, the support having a high strength such as polyethylene naphthalate and polyamide can be preferably used. If desired, the lamination type support which is disclosed in JP-A-3-224127 may be also used for changing the surface roughness between the magnetic layer surface and the non-magnetic support surface. These support (materials) may be previously subjected to corona discharge, plasma treatment, easy adhesion treatment, heat treatment, dust removing treatment, etc. In order to accomplish the objects of the present invention, it is necessary to use a non-magnetic support having a center-line average surface roughness (defined by JIS B 0601) of 0.03 μm or less, preferably 0.01 μm or less, more preferably 0.005 μm or less (cut off value: 0.08 μm). Such a non-magnetic support preferably not only has a small average surface roughness on the center line, but also has no big protrusions having a size of 1 μm or more. The shape of the surface roughness may be freely controlled by the size and amount of filler to be incorporated into the support as is necessary. Examples of the filler include oxide and carbonate of Ca, Si, and Ti, and finely divided particle of organic material such as acryl.

It is preferred that the supports have a maximum height (SRmax) of 1 μm or less, an average roughness of ten values (SRz) of 0.5 μm or less, a center face height (SRp) of 0.5 μm or less, a center face depth (SRv) of 0.5 μm or less, a center face area rate (SSr) of 10 to 90% and an average wavelength (Sλa) of 5 to 300 μm. Surface protrusion of these supports can be controlled with fillers within the range of 0 to 2,000 protrusions/0.1 mm$^2$, the protrusions having a size of 0.01 to 1 μm.

The non-magnetic support to be used in the present invention preferably exhibits F-5 (i.e., the load at the 5% elongation) values of 5 to 50 kg/mm$^2$ in the web running direction and 3 to 30 kg/mm$^2$ in the web width direction. In general, F-5 value in the web lengthwise (web running) direction is higher than F-5 value in the web width direction. However, if the crosswise (web width) strength of the non-magnetic support needs to be high, the present invention is not limited to this specification.

The non-magnetic support preferably exhibits a lengthwise (web running direction) and crosswise (web width direction) heat shrinkage of generally 3% or less, more preferably 1.5% or less, at 100° C. for 30 minutes and generally 1% or less, more preferably 0.5% or less, at 80° C. for 30 minutes. The breaking strength of the support is preferably in the range of 5 to 100 kg/mm$^2$ in both directions. The elastic modulus of the support is preferably in the range of 100 to 2,000 kg/mm$^2$ in both directions.

The magnetic layer of the magnetic recording medium in the present invention is formed by dispersing uniformly the ferromagnetic particles in the binder in addition to the above several additives to prepare the magnetic coating solution and then coating the magnetic coating solution on the non-magnetic support and drying.

Examples of organic solvents which can be used in the present invention include: ketones, such as acetone, methyl ethyl ketone, methyl isobutyl ketone, diisobutyl ketone, cyclohexanone, isophorone and tetrahydrofuran; alcohols, such as methanol, ethanol, propanol, butanol, isobutyl alcohol, isopropyl alcohol and methyl cyclohexanol; esters such as methyl acetate, butyl acetate, isobutyl acetate, isopropyl acetate, ethyl butyrate and glycol acetate; glycol ethers, such as glycol dimethyl ether, glycol monoethyl ether and dioxane; aromatic hydrocarbons such as benzene, toluene, xylene, cresol and chlorobenzene; chlorinated hydrocarbons, such as methylene chloride, ethylene chloride, carbon tetrachloride, chloroform, ethylene chlorohydrin and dichlorobenzene; N,N-dimethylformamide, and hexane. These organic solvents may be used in any proportion. These organic solvents are not necessarily 100% pure and may contain impurities such as isomers, unreacted matters, side reaction products, decomposition products, oxides and water content besides main components. The content of these impurities is preferably in the range of 30% or less, more preferably 10% or less.

If necessary, the kind of organic solvents to be used in the present invention may be the same from the magnetic layer and the non-magnetic layer, provided that the amount of the solvent used may be different. A solvent having a high surface tension (e.g., cyclohexanone, dioxane) may be used for the non-magnetic layer to enhance the coating stability. Specifically, it is essential that the arithmetic mean of the solvent composition for the magnetic layer is not smaller than that of the solvent composition for the non-magnetic layer. In order to enhance the dispersibility, the polarity of the organic solvent is preferably somewhat high. The solvents to be used for the coating solutions for the non-magnetic layer and the magnetic layer, each preferably contains a solvent having a solubility parameter of 8 to 11 and a dielectric constant of 15 or more at 20° C. in an amount of 50% or more.

The process for the preparation of the magnetic coating solution for the magnetic layer in the magnetic recording medium of the present invention comprises at least a kneading step, a dispersion step, and a mixing step which is optionally provided before or after these steps. These steps each may consist of two or more stages. The raw materials to be used in the present invention, e.g., ferromagnetic particles, binder resins, non-magnetic particles, carbon black, abrasives, antistatic agents, lubricants and solvents, may be added to the system at the beginning or during any step. These raw materials each may be batchwise added to the system at two or more steps. For example, polyurethane may be batchwise charged into the system at the kneading step, dispersion step or mixing step for viscosity adjustment after dispersion.

In order to accomplish the objects of the present invention, a known preparation technique can, of course, be used as a step. In the kneading step, an apparatus having a strong kneading power such as continuous kneader and pressure kneader can be preferably used. If a continuous kneader or pressure kneader is used, the magnetic particles are kneaded with the whole or part (preferably 30% by weight or more of the total weight of all binder resins) of the binder in an amount of 15 to 500 parts by weight based on 100 parts by weight of magnetic particles. These kneading techniques are further described in JP-A-1-106388 and JP-A-64-79274. In the preparation of the coating solution of the non-magnetic layer, a dispersion medium having a high specific gravity is preferably used. Zirconia beads are suitable.

Coating of the first magnetic layers of the magnetic recording media of the present invention and coating of the second magnetic layers thereon after drying of the first magnetic layers can be carried out by the use of known apparatus. However, for the second magnetic layers required to be formed as thin layers, blade coating or rod coating as described in JP-A-3-131364 is preferably used. When the non-magnetic layers are provided, it is preferred to form the non-magnetic layers and the second magnetic layers in the following manners:

1. Gravure coating method, roll coating method, blade coating method, extrusion coating method or the like that is normally used for a magnetic coating, is employed to provide a lower layer. An upper layer is then coated on the lower layer by means of a support pressure type extrusion coating apparatus as disclosed in JP-B-1-46186, JP-B-60-238179, and JP-B-2-265672 while the lower layer is wet;

2. An upper layer and a lower layer are coated almost simultaneously by means of a coating head having two coating passage slits as disclosed in JP-A-63-88080, JP-A-2-17971, and JP-A-2-265672; and 3. An upper layer and a lower layer are coated almost simultaneously by means of an extrusion coating apparatus with a backup roll as disclosed in JP-A-2-174965.

In order to inhibit the agglomeration of ferromagnetic particle that deteriorates the electro-magnetic characteristics of the magnetic recording medium, a method disclosed in JP-A-62-95174 and JP-A-1-236968 can be used to provide the coating solution inside the coating head with a shearing force. For the viscosity of the coating solution, the range disclosed in Japanese Patent Application No. 1-312659 is preferably satisfied.

As orientating apparatus for conducting longitudinal magnetic field orientation of the first magnetic layers, known ones can be used. However, it is desirable to use same-pole face (face to face) cobalt magnets of at least 3,000 G or solenoids of at least 1,000 G. When the solenoid is used, installation of a repulsion magnet for avoiding curvature of a magnetic field in the neighborhood of an outlet desirably reduces magnetization components in the width direction. Further, the pre-drying is preferably carried out.

Calender rolls are used for pressure forming treatment to smooth the surfaces of the magnetic layers in a final step. Such calender rolls include plastic rolls which are formed with heat-resistant plastic resins such as epoxy resins, polyimides, polyamides and polyimdeamides. When the magnetic layers are treated at a high calender pressure, the axis of easy magnetization of the tabular ferromagnetic hexagonal ferrite particles is easily perpendicularly arranged within a surface layer thickness of 0.05 μm. It is therefore preferred that calendering is conducted with metallic rolls. The treating temperature is desirably 80° C. or more, and more desirably 100° C. or more. The line pressure is desirably 200 kg/cm, and more desirably 300 kg/cm or more.

The coefficients of the magnetic layer surface of the magnetic recording medium of the present invention and the opposite surface thereof to SUS420J are generally 0.5 or less, and preferably 0.3 or less, at a temperature of −10° C. to 40° C. at a humidity of 0 to 95%. The inherent surface resistibility is desirably $10^4$ to $10^{12}$ Ω/sq for both the magnetic surface and the back surface, and the charge potential is desirably −500 to +500 V. The elastic modulus of the magnetic layer at 0.5% elongation is desirably 100 to 2,000 kg/mm² for both the running direction and the width direction, and the breaking strength is desirably 1 to 30 kg/cm². The elastic modulus of the magnetic recording medium is desirably 100 to 1,500 kg/mm² for both the running direction and the width direction, and the residual elongation is preferably 0.5% or less. The heat shrinkage percentage at all temperatures of 100° C. or less is desirably 1% or less, more desirably 0.5% or less, and most desirably 0.1% or less. The glass transition temperature (the maximum point of the loss modulus in dynamic viscoelasticity measured at 110 Hz) of the magnetic layer is preferably 50° to 120° C., and that of the lower non-magnetic layer is desirably 0° to 100° C. The loss modulus is desirably within the range of $1\times10^8$ to $8\times10^9$ dynes/cm², and the loss tangent is preferably 0.2 or less. If the loss tangent is too high, adhesion troubles are liable to take place. A residual solvent contained in the magnetic layer is desirably 100 mg/m² or less, and more desirably 10 mg/m² or less. It is preferred that the amount of a residual solvent contained in the second magnetic layer is less than that of a residual solvent contained in the first magnetic layer. The percentage of void is desirably 30% by volume or less, and more desirably 20% by volume or less, for both the lower non-magnetic layer and the magnetic layer. A smaller percentage of void is desirable for giving higher output, but a percentage which is high to some extent is occasionally preferred depending on the purposes. For example, in magnetic recording media for data recording in which importance is attached to repetition use, a larger percentage of void is often desirable for running durability.

Although the center line average surface roughness Ra of the magnetic layers is generally 0.008 μm or less, and desirably 0.004 μm or less, the RMS surface roughness (RRMS) determined by the AFM evaluation is desirably 2 to 15 nm. The glossiness is 160 or more, desirably 200 or more, and more desirably 240 or more. It is preferred that the magnetic layers have a maximum height (SRmax) of 0.5 μm or less, an average roughness of ten values (SRz) of 0.3 μm or less, a center face height (SRp) of 0.3 μm or less, a center face depth (SRv) of 0.3 μm or less, a center face area rate (SSr) of 20 to 80% and an average wavelength (SλA) of 5 to 300 μm. The number of surface projections of the magnetic layers is within the range of 0 to 2,000 protrusions having a size of 0.01 to 1 μm. They can be easily controlled by the control of surface properties of the non-magnetic supports by the fillers or the surface shape of the calender rolls.

The magnetic recording medium of the present invention comprises the non-magnetic layer and the magnetic layer. It is easily supposed that these physical characteristics can be varied in the non-magnetic layer and in the magnetic layer, according to the purposes. For example, the elastic modulus of the magnetic layer is raised to improve running durability, and the elastic modulus of the non-magnetic layer is lowered as compared with that of the magnetic layer to improve the contact of the magnetic recording medium with a head.

EXAMPLES

| Magnetic Coating X | |
|---|---|
| Tabular ferromagnetic hexagonal ferrite particle: (Hc: 1,500 Oe, specific surface area measured by the BET method: 40 m²/g, average particle size (tabular diameter): 0.05 μm, average tabular thickness: 0.01 μm, σs: 60 emu/g, surface treating agent: $Al_2O_3$ (5% by weight), $SiO_2$ (2% by weight) | 100 parts by weight |

-continued

| | |
|---|---|
| Vinyl chloride copolymer: <br> (—SO$_3$Na content: 1 × 10$^{-4}$ eq/g, <br> degree of polymerization: 300) | 12 parts by weight |
| Polyester polyurethane resin: <br> (neopentyl glycol/caprolactone <br> polyol/MDI (by mol) = 0.9/2.6/1, <br> —SO$_3$Na content: 1 × 10$^{-4}$ eq/g) | 3 parts by weight |
| α-Alumina: <br> (particle size: 0.3 μm) | 2 parts by weight |
| Carbon black: <br> (particle size: 0.015 μm) | 5 parts by weight |
| Butyl stearate: | 1 part by weight |
| Stearic acid: | 2 parts by weight |
| Methyl ethyl ketone: | 100 parts by weight |
| Cyclohexanone: | 100 parts by weight |
| Toluene: | 50 parts by weight |
| Magnetic Layer Coating Y | |
| Acicular ferromagnetic metal <br> particle: <br> (acicular ratio: 10, composition: <br> Fe/Zn/Ni = 92/4/4, Hc: 1,600 Oe, <br> specific surface area measured by <br> the BET method: 61 m$^2$/g, <br> crystallite size: 195 angstroms, <br> surface treating agent: Al$_2$O$_3$ <br> (5% by weight), SiO$_2$ (2% by weight), <br> particle size (length in the long <br> axis): 0.12 μm, σs: 130 emu/g) | 100 parts by weight |
| Vinyl chloride copolymer: <br> (—SO$_3$Na content: 1 × 10$^{-4}$ eq/g, <br> degree of polymerization: 300) | 12 parts by weight |
| Polyester polyurethane resin: <br> (neopentyl glycol/caprolactone <br> polyol/MDI (by mol) = 0.9/2.6/1, <br> —SO$_3$Na content: 1 × 10$^{-4}$ eq/g) | 3 parts by weight |
| α-Alumina: <br> (particle size: 0.3 μm) | 2 parts by weight |
| Carbon black: <br> (particle size: 0.10 μm) | 0.5 parts by weight |
| Butyl stearate: | 1 part by weight |
| Stearic acid: | 5 parts by weight |
| Methyl ethyl ketone: | 90 parts by weight |
| Cyclohexanone: | 30 parts by weight |
| Toluene: | 60 parts by weight |
| Non-magnetic Layer Coating Z | |
| Non-magnetic particle; TiO$_2$, <br> crystalline rutile: <br> (average primary particle <br> size: 0.035 μm, specific <br> surface area measured by <br> the BET method: 40 m$^2$/g, <br> pH: 7, TiO$_2$ content: 90% <br> or more, DBP oil adsorption: <br> 27–38 g/100 g, surface <br> treating agent: Al$_2$O$_3$ 8% <br> by weight) | 80 parts by weight |
| Carbon black: <br> (average primary particle <br> size: 16 mμ, DBP oil <br> adsorption: 80 ml/100 g, <br> pH: 8.0, specific surface <br> area measured by the BET <br> method: 250 m$^2$/g, volatile <br> component: 1.5% by weight) | 20 parts by weight |
| Vinyl chloride copolymer: <br> (—SO$_3$Na content: 1 × 10$^{-4}$ eq/g, <br> degree of polymerization: 300) | 12 parts by weight |
| Polyester polyurethane resin: <br> (neopentyl glycol/caprolactone <br> polyol/MDI (by mol) = 0.9/2.6/1, <br> —SO$_3$Na content: 1 × 10$^{-4}$ eq/g) | 5 parts by weight |
| Butyl stearate: | 1 part by weight |
| Stearic acid: | 1 part by weight |
| Methyl ethyl ketone/cyclohexanone <br> (6/4 by weight): | 250 parts by weight |

For each of the above-described three kinds of coatings, the respective ingredients were kneaded with a continuous kneader, and then dispersed by the use of a sand mill. To the resulting dispersion, a polyisocyanate was added in an amount of 3 parts by weight for a non-magnetic layer coating solution Z, and in an amount of 5 parts by weight for magnetic layer coating solutions X and Y, respectively. The resulting dispersions were filtered through a filter having an average pore size of 1 μm to prepare a non-magnetic layer coating solution X and magnetic layer coating solutions Y and Z, respectively.

EXAMPLE 1

A 7 μm-thick polyethylene terephthalate support having a center line surface roughness of 0.002 μm was simultaneously coated with the non-magnetic layer coating solution Z and with the magnetic coating solution X in multiple layers at a coating speed of 200 m/minute so as to give a non-magnetic layer having a thickness of 2 μm after drying and a magnetic layer having a thickness of 1.0 μm after drying, respectively. Then, orientation in the longitudinal direction was conducted in a 5 m-long same-pole faced cobalt magnet zone having a magnetic force of 5,000 G while passing drying air heated at 80° C. therethrough. Then, calendering treatment was conducted at 100° C. with a 7-stage calender made up of only metallic rolls, followed by slitting to a width of 8 mm to produce a 8-mm video tape. The resulting sample was named Sample A-2 shown in Table 1.

Then, samples were obtained in the same manner as with Sample A-2 except that the solvent was used in amounts of 200 parts by weight and 300 parts by weight, respectively. These samples were named Sample A-1 and Sample A-3, respectively.

A sample was obtained in the same manner as Sample A-2 except that barium ferrite particle having a tabular diameter of 0.03 μm and a tabular ratio of 3 was used. This sample was named Sample A-4. A sample was obtained in the same manner as Sample A-2 except that the tabular diameter was 0.07 μm and the tabular ratio was 7. This sample was named Sample A-5. A sample was obtained in the same manner as Sample A-2 except that the ferrite powder having a tabular diameter of 0.09 μm and a tabular ratio of 9 was used and the solvent was used in an amount of 300 parts by weight. This sample was named Sample A-6.

A sample was obtained in the same manner as Sample A-2 except that the orientation magnet having a magnetic force of 7,000 G was used. This sample was named Sample A-7. Samples were obtained in the same manner as Sample A-2 except that the drying temperatures were 60° C. and 100° C., respectively. These samples were named Sample A-8 and Sample A-9, respectively.

Samples were obtained in the same manner as Sample A-2 except that the calendering temperatures were 80° C. and 120° C., respectively. These samples were named Sample A-10 and Sample A-11, respectively.

A sample was obtained in the same manner as Sample A-2 except that metallic rolls and epoxy rolls were used in combination as the calender rolls and the calendering treatment was conducted at 90° C. This sample was named Sample A-12.

COMPARATIVE EXAMPLE 1

A sample was prepared in the same manner as Sample A-2 except that the solvent was used in an amount of 200 parts by weight, the orientation magnet having a magnetic force of 3,000 G was used without drying in the magnetic zone, metallic rolls and epoxy rolls were used in combination as the calender rolls and the calendering treatment was conducted at 90° C. This sample was named Sample B-1.

A sample was prepared in the same manner as Sample A-2 except that the solvent was used in an amount of 150 parts by weight, the orientation magnet having a magnetic force of 3,000 G was used without drying in the magnetic zone, metallic rolls and epoxy rolls were used in combination as the calender rolls and the calendering treatment was conducted at 90° C. This sample was named Sample B-2.

EXAMPLE 2

Samples were obtained in the same manner as Sample A-1 to A-12, respectively, except that a 7 μm-thick polyethylene terephthalate support having a center line surface roughness of 0.002 μm was simultaneously coated in multiple layers with the non-magnetic layer coating solution Z so as to give a non-magnetic layer having a thickness of 2.0 μm after drying, immediately thereafter with the magnetic layer coating solution Y so as to give a magnetic layer having thickness of 0.8 μm after drying, and further with a magnetic coating solution X so as to give a magnetic layer having a thickness of 0.2 μm after drying. The resulting samples were named Samples A-13 to A-24, respectively, as shown in Table 2.

COMPARATIVE EXAMPLE 2

Samples were obtained in the same manner as Samples B-1 and B-2, respectively, except that a 7 μm-thick polyethylene terephthalate support having a center line surface roughness of 0.002 μm was simultaneously coated in multiple layers with the non-magnetic layer coating solution Z so as to give a non-magnetic layer having a thickness of 2.0 μm after drying, immediately thereafter with the magnetic layer coating solution Y so as to give a magnetic layer having a thickness of 0.8 μm after drying, and further with the magnetic coating solution X so as to give a thickness of 0.2 μm after drying. The resulting samples were named Samples B-3 and B-4, respectively, as shown in Table 2.

TABLE 1

| | Hexagonal Ferrite Tabular Ratio | Amount of Solvent (wt %) | Orientation Strength of Magnetic Field (G) | Orientation Drying Temperature (°C.) | Calendering Rolls | Calendering Temperature (°C.) | Glossiness Longitudinal Direction (%) | Width Direction (%) | Output 10 MHz (dB) |
|---|---|---|---|---|---|---|---|---|---|
| A-1 | 5 | 200 | 5000 | 80 | metal-metal | 100 | 220 | 217 | 2.5 |
| A-2 | 5 | 250 | 5000 | 80 | metal-metal | 100 | 225 | 218 | 3.2 |
| A-3 | 5 | 300 | 5000 | 80 | metal-metal | 100 | 228 | 218 | 3.8 |
| A-4 | 3 | 250 | 5000 | 80 | metal-metal | 100 | 225 | 221 | 3.3 |
| A-5 | 7 | 250 | 5000 | 80 | metal-metal | 100 | 224 | 218 | 3.0 |
| A-6 | 9 | 300 | 5000 | 80 | metal-metal | 100 | 232 | 215 | 4.2 |
| A-7 | 5 | 250 | 7000 | 80 | metal-metal | 100 | 228 | 217 | 3.8 |
| A-8 | 5 | 250 | 5000 | 60 | metal-metal | 100 | 223 | 219 | 2.7 |
| A-9 | 5 | 250 | 5000 | 100 | metal-metal | 100 | 230 | 216 | 4.0 |
| A-10 | 5 | 250 | 5000 | 80 | metal-metal | 80 | 209 | 201 | 1.8 |
| A-11 | 5 | 250 | 5000 | 80 | metal-metal | 120 | 243 | 230 | 4.5 |
| A-12 | 5 | 250 | 5000 | 80 | metal-epoxy | 90 | 205 | 198 | 1.8 |
| B-1 | 5 | 200 | 3000 | not dried | metal-epoxy | 90 | 200 | 200 | 0.6 |
| B-2 | 5 | 150 | 3000 | not dried | metal-epoxy | 90 | 195 | 204 | 0.2 |

TABLE 2

| | Hexagonal Ferrite Tabular Ratio | Amount of Solvent (wt %) | Orientation Strength of Magnetic Field (G) | Orientation Drying Temperature (°C.) | Calendering Rolls | Calendering Temperature (°C.) | Glossiness Longitudinal Direction (%) | Width Direction (%) | Output 2 MHz (dB) | Output 10 MHz (dB) |
|---|---|---|---|---|---|---|---|---|---|---|
| A-13 | 5 | 200 | 5000 | 80 | metal-metal | 100 | 222 | 216 | 1.0 | 2.6 |
| A-14 | 5 | 250 | 5000 | 80 | metal-metal | 100 | 224 | 217 | 1.1 | 3.1 |
| A-15 | 5 | 300 | 5000 | 80 | metal-metal | 100 | 229 | 217 | 1.2 | 3.8 |
| A-16 | 3 | 250 | 5000 | 80 | metal-metal | 100 | 225 | 221 | 1.2 | 3.1 |
| A-17 | 7 | 250 | 5000 | 80 | metal-metal | 100 | 225 | 218 | 1.1 | 3.1 |
| A-18 | 9 | 300 | 5000 | 80 | metal-metal | 100 | 231 | 215 | 1.2 | 4.0 |
| A-19 | 5 | 250 | 7000 | 80 | metal-metal | 100 | 227 | 217 | 1.2 | 3.8 |

TABLE 2-continued

| | Hexagonal Ferrite Tabular Ratio | Amount of Solvent (wt %) | Orientation Strength of Magnetic Field (G) | Drying Temperature (°C.) | Calendering Rolls | Calendering Temperature (°C.) | Glossiness Longitudinal Direction (%) | Width Direction (%) | Output 2 MHz (dB) | Output 10 MHz (dB) |
|---|---|---|---|---|---|---|---|---|---|---|
| A-20 | 5 | 250 | 5000 | 60 | metal-metal | 100 | 224 | 219 | 1.0 | 2.8 |
| A-21 | 5 | 250 | 5000 | 100 | metal-metal | 100 | 229 | 216 | 1.3 | 4.1 |
| A-22 | 5 | 250 | 5000 | 80 | metal-metal | 80 | 208 | 200 | 0.8 | 1.7 |
| A-23 | 5 | 250 | 5000 | 80 | metal-metal | 120 | 240 | 230 | 1.4 | 4.5 |
| A-24 | 5 | 250 | 5000 | 80 | metal-epoxy | 90 | 202 | 195 | 0.7 | 1.6 |
| B-3 | 5 | 200 | 3000 | not dried | metal-epoxy | 90 | 200 | 201 | 0.3 | 0.6 |
| B-4 | 5 | 150 | 3000 | not dried | metal-epoxy | 90 | 194 | 204 | 0.0 | 0.0 |

Evaluation Methods

Glossiness

The glossiness was measured in accordance with JIS-Z-8741, taking a specular glossiness of a glass surface having a refractive index of 1.567 at an angle of incidence of 45° as 100%. Specifically, a digital gloss meter (GK45D, manufactured by Suga Shikenki K.K.) was used.

In the present invention, of a glossiness in the normal direction and a glossiness in the reverse direction, a higher value was used for the glossiness in the longitudinal direction. The glossiness in the width direction generally shows the same value regardless of its measurement direction. When the difference appeared, a higher value was used.

Electromagnetic Characteristics (10 MHz and 2 MHz Outputs)

Using a 8-mm video deck (FUJIX8, manufactured by Fuji Photo Film Co., Ltd.), a 7-MHz signal was recorded, and when this signal was reproduced, 10-MHz and 2-MHz signal reproduction outputs were measured with an oscilloscope. A 8-mm video tape ("SAGP 6-120", manufactured by Fuji Photo Film Co., Ltd.) was used as a reference tape.

The ferromagnetic hexagonal ferrite particles are magnetically orientated in the longitudinal direction of the media, and the glossiness of the magnetic layers in the longitudinal direction of the media is controlled to 200% or more and at least 3% higher than that in the lateral direction, thereby exhibiting good short-wavelength output.

What is claimed is:

1. A magnetic recording medium comprising a non-magnetic support having thereon a magnetic layer comprising a tabular ferromagnetic hexagonal ferrite particle and a binder, wherein said ferromagnetic hexagonal ferrite particle is magnetically oriented in the longitudinal direction of the medium, and said magnetic layer has a coercive force in a longitudinal direction of 500 to 4000 Oe and has a glossiness in the longitudinal direction of the medium of 200% or more and at least 3% higher than that in the width direction of the medium.

2. The magnetic recording medium as claimed in claim 1, wherein said magnetic layer has thereunder a magnetic layer comprising an acicular ferromagnetic particle and a binder.

3. The magnetic recording medium as claimed in claim 1, wherein said non-magnetic support has a non-magnetic layer comprising a non-magnetic particle and a binder directly on the non-magnetic support, and between the non-magnetic support and the magnetic layer.

4. The magnetic recording medium as claimed in claim 2, wherein said non-magnetic support has a non-magnetic layer comprising a non-magnetic particle and a binder directly on the non-magnetic support, and between the non-magnetic support and the magnetic layer comprising an acicular ferromagnetic particle and a binder.

* * * * *